United States Patent [19]

Chabrolle

[11] Patent Number: 4,628,386
[45] Date of Patent: Dec. 9, 1986

[54] MAGNETIC READING AND/OR WRITING HEAD SUPPORT ASSEMBLY

[75] Inventor: Jacques Chabrolle, Bagnolet, France

[73] Assignee: LCC.CICE-Compagnie Europeenne de Composants Electroniques, Bagnolet, France

[21] Appl. No.: 469,457

[22] Filed: Feb. 24, 1983

[30] Foreign Application Priority Data

Feb. 26, 1982 [FR] France .............................. 82 03260

[51] Int. Cl.$^4$ .......................... G11B 5/48; G11B 21/20
[52] U.S. Cl. ........................................ 360/104; 360/2; 360/109
[58] Field of Search .................. 360/104, 105, 109, 2, 360/101, 130.3, 129; 235/449–450

[56] References Cited

U.S. PATENT DOCUMENTS 3,831,188  8/1974  Zupancic et al. ...................... 360/88
3,940,796  2/1976  Haun et al. ........................... 360/109
4,375,071  2/1983  Crowley et al. ...................... 360/104

FOREIGN PATENT DOCUMENTS 2659640  2/1978  Fed. Rep. of Germany .
624236   12/1978  France .

OTHER PUBLICATIONS

Hickox, "Head Mount", IBM TDB, Jul. 1975, vol. 18, No. 2, p. 541.
Mueller, "Magnetic Stripe Reader/Writer with Improved Head Suspension," Oct. 1976, IBM TDB, vol. 19, No. 5, pp. 1808–1809.

Primary Examiner—John H. Wolff
Assistant Examiner—David J. Severin
Attorney, Agent, or Firm—Oblon, Fisher, Spivak, McClelland & Maier

[57] ABSTRACT

The invention provides a magnetic reading and/or writing device comprising a guide for a magnetic data carrier and a magnetic head support. The magnetic head support has a stirrup piece movable in translation with respect to a fixed piece and a magnetic head rotatably mounted on the mobile stirrup piece. The mobile stirrup piece is urged resiliently to press the magnetic head against the magnetic carrier.

5 Claims, 6 Drawing Figures

MAGNETIC READING AND/OR WRITING HEAD SUPPORT ASSEMBLY

BACKGROUND OF THE INVENTION

The present invention relates to a magnetic reading and/or writing device, intended more especially for magnetic data carriers such as magnetic cards.

Such a device generally comprises a guide for a magnetic medium and a magnetic head support. It poses problems at the level of the contact between the head and the track of the magnetic data medium or carrier, because this latter is generally rigid or semi-rigid (plastic, cardboard etc . . . ). In fact, if such carriers have practically permanent deformations of any kind whatever this make contact with the magnetic head difficult.

The present invention provides a device which does not have the above-mentioned drawbacks.

SUMMARY OF THE INVENTION

The invention relates to a magnetic reading and/or writing device comprising a guide for a magnetic carrier and a magnetic head support, wherein the magnetic head support comprises a mobile stirrup piece capable of translational movement with respect to a fixed piece, and a magnetic head mounted on the mobile stirrup piece and rotatable about an axis, and it further comprises a means for resiliently returning the mobile stirrup piece in a direction in which the magnetic head presses the magnetic carrier forwardly against the guide.

Said axis is preferably parallel to the direction of movement of the magnetic carrier in the guide.

According to one embodiment, the mobile stirrup piece has two pivots disposed along said axis and on each side of the magnetic head mounted for free rotation about the two pivots. The fixed piece may have two grooves in which the pivots are engaged so as to provide translational guiding of the mobile stirrup piece. The two grooves may be formed each in a lateral face of the fixed piece which also forms a stop for the mobile stirrup piece in the direction in which it presses the magnetic carrier against said guide.

In one embodiment, the mobile stirrup piece has a central part carrying a guide about which is disposed a spring which slides in a bore formed in a rear face of the fixed piece.

In another embodiment, the fixed piece is mounted on a plate by means of screws engaged in grooves in the fixed piece.

In a further embodiment, a non magnetic metal foil, thin and resistant to abrasion, is fixed to the guide of a magnetic carrier and is located adjacent the magnetic head so that it protects the magnetic head against wear during passage of the magnetic carrier.

BRIEF DESCRIPTION OF THE DRAWINGS

The invention will be better understood from the following description given by way of non limiting example, with reference to the drawings in which.

DESCRIPTION OF THE PREFERRED EMBODIMENTS

Figure 1:
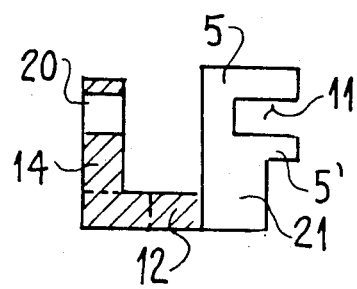
FIGS. 1*a* and 1*b* show the fixed piece of the invention respectively in vertical section and in a top view.
Figure 1:
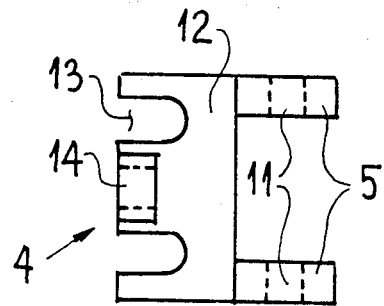

FIGS. 1*a* and 1*b* show a fixed piece designated by the general reference 4. It comprises a generally rectangular shaped base plate 12 which has on one of its large sides, and perpendicularly thereto, two symmetrical grooves 13. The opposite large side has at each of its ends a lateral face 21 each of which extends the small sides of the rectangle. Each lateral face 21 is formed with a groove 11 defined by two forks 5 and 5'. Between the two grooves 13 of base plate 12 is formed a rear face 14 having a bore 20.

Figure 2:
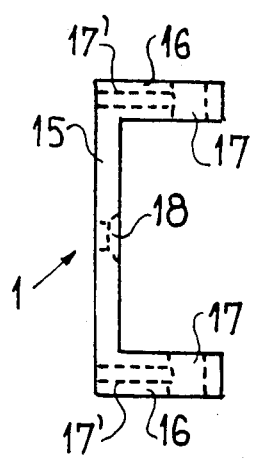
FIG. 2*a* shows the mobile stirrup piece of the invention in a top view.
FIG. 2*b* shows in section a spring guide in accordance with the invention.
Figure 2:
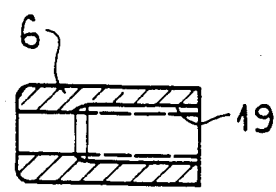

FIG. 2*a* shows the mobile stirrup piece designated by the general reference 1. It comprises a central part 15 and, perpendicularly thereto and at its ends, two lateral parts 16 situated on the same side. A bore 18 passes centrally through the central part 15 for receiving a screw head and letting its shank pass therethrough in the direction opposite the lateral parts 16. The lateral parts 16 each have a bore 17 with axis parallel to the longitudinal direction of the central part 15, as well as a bore 17' extending from one end of the central part 15 and opening into the corresponding bore 17.

FIG. 2*b* shows a spring guide 6. It is in the form of a cylindrical part provided with an axial bore tapped at 19 over a part of its length. Its outer diameter corresponds to that of said bore 20, provided in the rear face 14.

Figure 3:
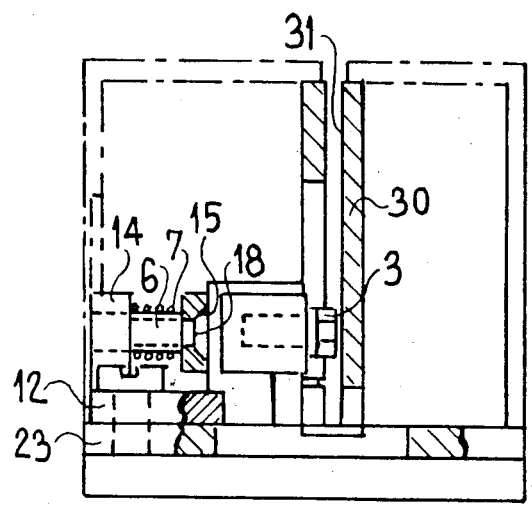
FIGS. 3*a* and 3*b* show a device of the invention in the fitted condition, respectively in vertical section and in a top view.
Figure 3:
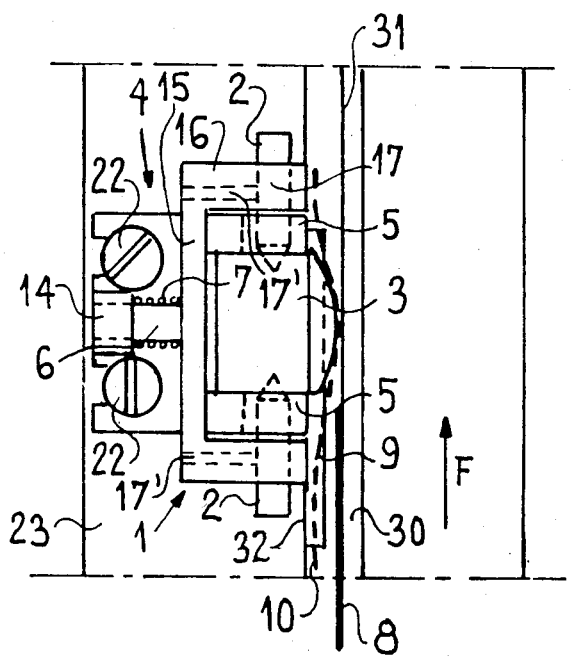

In FIGS. 3*a* and 3*b*, the fixed piece 4 is fixed to a plate 23 by means of screws 22 inserted in grooves 13. These grooves allow adjustment of the whole of the device in the direction of a guide 30 for a magnetic carrier 8, such as a magnetic card. This guide 30 is conventionally in the form of a slit in which the magnetic carrier 8 is moved horizontally in the direction of arrow F.

Spring guide 6 is fixed to the mobile stirrup piece 1 by means of a screw introduced into bore 18 and screwed into the tapping 19, guide 6 about which spring 7 is disposed having been previously introduced into bore 20 from the rear face 14 of the fixed piece 4. Spring 7 is thus compressed between the rear face 14 and the central part 15. Two pivots 2 2, for example stubs, are introduced into the bores 17 of the mobile stirrup piece 1 and hold a magnetic head 3 in position between the points thereof so that it is rotatable. Shafts 2 are fixed in position by means of self-tapping screws screwed into bores 17'. Since the mobile stirrup piece 1 is wider than fixed piece 4, pivots 2 pass through grooves 11 whose width is adjusted so that the mobile stirrup piece 1 may freely slide without play in the horizontal plane. The mobile stirrup piece 1 is further guided by sliding of guide 6 in bore 20.

Under the action of spring 7, and in the absence of a magnetic carrier 8, the central part 15 of the fixed stirrup piece comes into abutment against the lateral faces 21 of the fixed piece. The air-gap of the magnetic head 3 is then spaced apart from opposite wall 31 of guide 30 by a distance less than the thickness of the magnetic carrier 8. Thus, the return force of spring 7 will maintain the contact between the magnetic head 3 and the magnetic track of the magnetic carrier 8. Rotation of head 3 about pivots 2 will also allow this latter to remain in contact with the magnetic track in the presence of lateral buckling of the carrier 8.

In a particularly advantageous embodiment, a metal foil 9 is placed between the magnetic head 3 and the wall 31 of guide 30 and is fixed to the face 32 of guide 30 situated on the same side as head 3, or to the plate 23. This foil may be fixed at 10 upstream of head 3 with respect to the direction of movement of the magnetic carrier 8. The metal foil 9 protects the head 3 from abrasion due to the rubbing force with carrier 8. The metal foil 9 must therefore be non magnetic and thin (for example having a thickness less than 20 microns) so as not to disturb reading of the card. It must moreover be resistant to abrasion so as to withstand without damage rubbing against the magnetic carrier 8. A suitable material is titanium nitride or even a stainless and non magnetic spring steel such as "Phynox" (a registered trademark belonging to the Imphy steelworks).

The invention is not limited to the embodiment described. Thus, the lateral faces 21 may be mounted externally of the lateral part 16 so as to retain the effect of guiding by grooves 11, in which case the abutment effect is obtained by protuberances extending the central part 15 or else carried by plate 23. The lateral faces 21 may also be imbricated with the lateral parts 16.

Furthermore, the device of the invention may receive a multi-track head.

Finally, a single head-holder may be equipped with lateral faces 21 in which are provided as many grooves 11 as independent heads desired, each of them being associated with a stirrup piece 1.

What is claimed is:

1. In a magnetic reading and/or writing device having a guide for guiding a magnetic data carrier in a first direction, and a magnetic head for reading and/or writing data on said carrier, a magnetic head support comprising:
    a mobile stirrup piece positioned adjacent said guide with said data carrier positionable therebetween;
    pivot means fixed to said stirrup piece and pivotally supporting said head for rotation only about an axis parallel to said first direction;
    a fixed piece fixed adjacent said guide;
    means associated with said fixed piece for supporting and guiding said stirrup piece only for movement in a linear second direction transverse to said first direction, wherein said fixed piece has two grooves extending in said second direction and in which said pivot means are engaged, said grooves forming a portion of said supporting and guiding means for said mobile stirrup piece; and
    means for biasing said stirrup piece towards said guide, whereby said carrier is pressed against said head and said guide.

2. The device as claimed in claim 1, wherein said two grooves are formed each in a lateral face of said fixed piece and said fixed piece includes a part forming a stop for said mobile stirrup piece in said second direction in which said stirrup piece presses said magnetic carrier against said guide.

3. The device as claimed in claim 2, wherein said mobile stirrup piece has a central part including a spring guide about which is disposed a spring, said spring comprising said biasing means, said spring guide being fixed to said central part and being slidable in a bore provided in a rear face of said fixed piece to form another portion of said supporting and guiding means.

4. The device as claimed in claim 3, wherein said fixed piece is mounted on a plate by means of screws engaging in grooves in said fixed piece.

5. The device as claimed in claim 4, including a thin non-magnetic foil resistant to abrasion fixed on said guide and adjacent the magnetic head so that said foil protects the magnetic head against wear during passage of the magnetic carrier.

* * * * *